United States Patent
Zhang et al.

(10) Patent No.: US 10,454,297 B2
(45) Date of Patent: Oct. 22, 2019

(54) WEARABLE DEVICE AND TERMINAL

(71) Applicant: BOE TECHNOLOGY GROUP CO., LTD., Beijing (CN)

(72) Inventors: Wei Zhang, Beijing (CN); Zhanfeng Cao, Beijing (CN); Yanjun Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 265 days.

(21) Appl. No.: 15/217,478

(22) Filed: Jul. 22, 2016

(65) Prior Publication Data
US 2017/0033589 A1    Feb. 2, 2017

(30) Foreign Application Priority Data

Jul. 30, 2015 (CN) .......................... 2015 1 0461236

(51) Int. Cl.
*H02J 7/02* (2016.01)
*H02J 7/32* (2006.01)
(Continued)

(52) U.S. Cl.
CPC ................ *H02J 7/32* (2013.01); *H02J 7/025* (2013.01); *H02J 50/10* (2016.02); *H02J 50/70* (2016.02); *H02J 7/345* (2013.01)

(58) Field of Classification Search
CPC .... H02J 7/32; H02J 50/10; H02J 50/70; H02J 7/025
(Continued)

(56) References Cited

U.S. PATENT DOCUMENTS 4,245,640 A * 1/1981 Hunt .................... A61N 1/3785
607/33
4,321,572 A * 3/1982 Studer .................... H01F 38/18
336/120
(Continued)

FOREIGN PATENT DOCUMENTS

CN         2385460 Y     6/2000
CN        201229835 Y    4/2009
(Continued)

OTHER PUBLICATIONS

First Office Action regarding Chinese application No. 201510461236.X, dated Dec. 27, 2016. Translation provided by Dragon Intellectual Property Law Firm.
(Continued)

*Primary Examiner* — Robert Grant
*Assistant Examiner* — John T Trischler
(74) *Attorney, Agent, or Firm* — Harness, Dickey & Pierce, P.L.C.

(57) ABSTRACT

Disclosed are a wearable device and a terminal. The wearable device includes: a wearable component and a power supply component fixed on the wearable component. The power supply component includes a first supporting surface, an energy conversion element and an energy storage element. The energy conversion element includes: a magnetic structure, an elastic structure and an induction coil. One end of the magnetic structure is connected to the first supporting surface through the elastic structure. The magnetic structure moves with respect to the induction coil through the elastic structure when the wearable device is shaken, such that an alternating current is generated in the induction coil. The energy storage element is adapted to store electric energy obtained by the energy conversion element.

12 Claims, 3 Drawing Sheets

US 10,454,297 B2

Page 2

(51) Int. Cl.
  *H02J 50/10* (2016.01)
  *H02J 50/70* (2016.01)
  *H02J 7/34* (2006.01)

(58) Field of Classification Search
  USPC ........................................................ 320/108
  See application file for complete search history.

(56) References Cited

U.S. PATENT DOCUMENTS

| | | | | |
|---|---|---|---|---|
| 4,837,494 A * | 6/1989 | Maier | A43B 3/0005 | 219/211 |
| 4,904,256 A * | 2/1990 | Yamaguchi | A61F 2/0018 | 128/DIG. 25 |
| 5,315,279 A * | 5/1994 | Ito | H01F 3/14 | 336/178 |
| 5,358,461 A * | 10/1994 | Bailey, Jr. | A63B 21/0053 | 290/1 R |
| 5,434,549 A * | 7/1995 | Hirabayashi | H02K 33/00 | 335/229 |
| 5,804,892 A * | 9/1998 | Schwan | H01F 38/14 | 307/104 |
| 5,907,231 A * | 5/1999 | Watanabe | H01F 38/14 | 320/108 |
| 5,917,307 A * | 6/1999 | Watanabe | H01F 38/14 | 320/108 |
| 6,084,381 A * | 7/2000 | Kajiura | H02J 7/025 | 320/108 |
| 6,211,765 B1 * | 4/2001 | Ito | H01F 3/14 | 336/134 |
| 6,346,791 B1 * | 2/2002 | Barguirdjian | H02J 7/32 | 320/101 |
| 6,512,437 B2 * | 1/2003 | Jin | H01F 38/14 | 336/120 |
| 6,559,560 B1 * | 5/2003 | Jin | H01F 38/14 | 307/104 |
| 7,038,335 B2 * | 5/2006 | Choi | B06B 1/045 | 310/12.24 |
| 7,323,790 B2 * | 1/2008 | Taylor | F03B 13/1895 | 290/42 |
| 7,501,726 B1 * | 3/2009 | Waters | H02K 35/00 | 310/36 |
| 7,514,818 B2 * | 4/2009 | Abe | H01F 38/14 | 307/104 |
| 7,646,863 B2 * | 1/2010 | Johnston | H02J 7/32 | 379/428.02 |
| 7,688,036 B2 * | 3/2010 | Yarger | H01M 6/5033 | 320/137 |
| 8,304,937 B2 * | 11/2012 | Cederwall | H02K 35/02 | 310/15 |
| 8,387,599 B2 * | 3/2013 | McAlister | F02M 57/06 | 123/41.05 |
| 8,555,860 B2 * | 10/2013 | McAlister | F02M 57/005 | 123/490 |
| 8,581,426 B2 * | 11/2013 | Seike | H01M 10/46 | 290/1 R |
| 8,587,154 B2 * | 11/2013 | Fells | H01F 38/14 | 307/104 |
| 8,610,311 B1 * | 12/2013 | Grimes | H01F 30/06 | 307/104 |
| 8,629,572 B1 * | 1/2014 | Phillips | F03B 13/16 | 290/42 |
| 8,635,985 B2 * | 1/2014 | McAlister | F02M 57/005 | 123/297 |
| 8,883,351 B2 * | 11/2014 | Todoriki | H01G 11/22 | 429/231.8 |
| 8,907,533 B2 * | 12/2014 | Battlogg | H02K 35/02 | 290/53 |
| 8,946,919 B2 * | 2/2015 | Phillips | F03B 13/16 | 290/42 |
| 8,946,920 B2 * | 2/2015 | Phillips | F03B 13/16 | 290/42 |
| 8,952,560 B2 * | 2/2015 | Phillips | F03B 13/16 | 290/42 |
| 8,963,358 B2 * | 2/2015 | Phillips | F03B 13/16 | 290/53 |
| 8,997,725 B2 * | 4/2015 | McAlister | F02M 57/06 | 123/492 |
| 9,341,152 B2 * | 5/2016 | McAlister | F02M 57/005 | |
| 9,476,400 B2 * | 10/2016 | Phillips | F03B 13/16 | |
| 9,490,729 B2 * | 11/2016 | Hasegawa | H02N 2/188 | |
| 9,553,477 B2 * | 1/2017 | Yang | H02J 7/025 | |
| 9,581,116 B2 * | 2/2017 | McAlister | F02M 57/005 | |
| 9,595,384 B2 * | 3/2017 | Nakamura | H01F 17/0013 | |
| 9,620,270 B2 * | 4/2017 | Uemoto | H01F 3/08 | |
| 9,624,900 B2 * | 4/2017 | Phillips | F03B 13/16 | |
| 9,641,093 B2 * | 5/2017 | Artelsmair | B23K 11/241 | |
| 9,644,601 B2 * | 5/2017 | Phillips | F03B 13/16 | |
| 9,645,248 B2 * | 5/2017 | Wallace | G01S 19/421 | |
| 9,647,483 B1 * | 5/2017 | Bana | H02J 7/025 | |
| 9,774,715 B2 * | 9/2017 | Ma | H04M 1/03 | |
| 9,837,198 B2 * | 12/2017 | Liu | H01F 27/2804 | |
| 9,859,051 B2 * | 1/2018 | Ren | H01F 38/14 | |
| 9,866,037 B2 * | 1/2018 | Maekawa | H02J 5/005 | |
| 9,893,536 B2 * | 2/2018 | Zhou | H01F 27/346 | |
| 9,948,358 B2 * | 4/2018 | Fells | H01F 38/14 | |
| 2002/0057164 A1 * | 5/2002 | Jin | H01F 38/14 | 336/115 |
| 2005/0244016 A1 * | 11/2005 | Norris | H04B 5/0006 | 381/77 |
| 2006/0208839 A1 * | 9/2006 | Taylor | F03B 13/1895 | 335/205 |
| 2006/0214628 A1 * | 9/2006 | Chang | H02J 50/10 | 320/108 |
| 2007/0091519 A1 * | 4/2007 | Abe | H01F 38/14 | 361/38 |
| 2008/0074083 A1 * | 3/2008 | Yarger | H01M 6/5033 | 320/137 |
| 2008/0116849 A1 * | 5/2008 | Johnston | H02J 7/32 | 320/114 |
| 2009/0219139 A1 * | 9/2009 | Slesinski | F03G 7/08 | 340/10.1 |
| 2009/0230786 A1 * | 9/2009 | Liu | H02K 35/02 | 310/15 |
| 2010/0183993 A1 * | 7/2010 | McAlister | F02M 57/005 | 431/254 |
| 2011/0042476 A1 * | 2/2011 | McAlister | F02M 57/005 | 239/5 |
| 2011/0048374 A1 * | 3/2011 | McAlister | F02M 57/06 | 123/436 |
| 2012/0007437 A1 * | 1/2012 | Fells | H01F 38/14 | 307/104 |
| 2012/0028127 A1 * | 2/2012 | Wei | B82Y 30/00 | 429/300 |
| 2012/0109399 A1 * | 5/2012 | Tran | H02J 3/14 | 700/296 |
| 2012/0139389 A1 * | 6/2012 | Bohringer | H02N 2/186 | 310/300 |
| 2012/0258367 A1 * | 10/2012 | Jung | H01B 1/122 | 429/231.1 |
| 2012/0320492 A1 * | 12/2012 | Radivojevic | H01G 11/14 | 361/291 |
| 2013/0019460 A1 * | 1/2013 | Mayes | A47G 33/00 | 29/592.1 |
| 2013/0026999 A1 * | 1/2013 | Lee | H02J 7/0011 | 320/162 |
| 2013/0249325 A1 | 9/2013 | Park et al. | | |
| 2013/0266869 A1 * | 10/2013 | Todoriki | H01G 11/22 | 429/231.8 |
| 2013/0335011 A1 * | 12/2013 | Bohringer | H02N 11/002 | 320/107 |
| 2014/0042824 A1 * | 2/2014 | Fells | H01F 38/14 | 307/104 |
| 2014/0048037 A1 * | 2/2014 | McAlister | F02M 57/06 | 123/297 |
| 2014/0063864 A1 * | 3/2014 | Liu | H01F 27/2804 | 363/21.12 |
| 2014/0117673 A1 * | 5/2014 | Phillips | F03B 13/16 | 290/53 |

(56) References Cited

U.S. PATENT DOCUMENTS

| | | | |
|---|---|---|---|
| 2014/0117674 A1* | 5/2014 | Phillips | F03B 13/16 290/53 |
| 2014/0203902 A1* | 7/2014 | Shippee | H01F 5/003 336/221 |
| 2014/0255776 A1* | 9/2014 | Song | H01G 11/32 429/211 |
| 2014/0263697 A1* | 9/2014 | McAlister | F02M 57/005 239/5 |
| 2014/0292570 A1* | 10/2014 | Wallace | G01S 19/41 342/357.42 |
| 2014/0313001 A1* | 10/2014 | Phillips | F03B 13/16 335/306 |
| 2014/0333144 A1* | 11/2014 | Ikeuchi | H01F 38/14 307/104 |
| 2014/0339928 A1* | 11/2014 | Phillips | F03B 13/16 310/30 |
| 2014/0345563 A1* | 11/2014 | McAlister | F02M 57/005 123/297 |
| 2014/0361642 A1* | 12/2014 | Seo | A61N 1/3785 310/36 |
| 2015/0035634 A1* | 2/2015 | Nakamura | H01F 17/0013 336/170 |
| 2015/0042101 A1* | 2/2015 | Luo | H02K 35/02 290/1 A |
| 2015/0064565 A1* | 3/2015 | Todoriki | H01G 11/22 429/231.8 |
| 2015/0145258 A1* | 5/2015 | Phillips | F03B 13/16 290/53 |
| 2015/0162120 A1* | 6/2015 | Ren | H01F 38/14 307/104 |
| 2015/0179323 A1* | 6/2015 | Uemoto | H01F 3/10 336/221 |
| 2015/0221432 A1* | 8/2015 | Zhou | H01F 27/346 361/679.01 |
| 2015/0288300 A1* | 10/2015 | Hasegawa | H01L 41/125 310/26 |
| 2015/0349575 A1* | 12/2015 | Yang | H02J 7/025 455/573 |
| 2015/0357833 A1* | 12/2015 | Maekawa | H02J 7/0042 307/104 |
| 2015/0364931 A1* | 12/2015 | Ren | H01F 38/14 307/104 |
| 2016/0010619 A1* | 1/2016 | Phillips | F03B 13/16 290/53 |
| 2016/0100651 A1* | 4/2016 | Rastegar | H02K 7/1861 36/2.6 |
| 2016/0252071 A1* | 9/2016 | Phillips | F03B 13/20 290/50 |
| 2017/0113154 A1* | 4/2017 | Kheterpal | A63H 5/00 |
| 2017/0151577 A1* | 6/2017 | Baltz | B05B 5/005 |
| 2017/0169924 A1* | 6/2017 | Uemoto | H01F 1/37 |
| 2017/0198401 A1* | 7/2017 | Phillips | C25B 9/04 |
| 2017/0208161 A1* | 7/2017 | Ma | H04M 1/03 |
| 2017/0237061 A1* | 8/2017 | Song | H01G 11/32 429/224 |
| 2017/0279311 A1* | 9/2017 | Hanabusa | H02J 50/90 |
| 2017/0350241 A1* | 12/2017 | Shi | E21B 47/01 |

FOREIGN PATENT DOCUMENTS

| | | |
|---|---|---|
| CN | 202840645 U | 3/2013 |
| CN | 103935207 A * | 7/2014 |

OTHER PUBLICATIONS

Second Office Action regarding Chinese Application No. 201510461236. X, dated Jul. 11, 2017. Translation provided by Dragon Intellectual Property Law Firm.

* cited by examiner

WEARABLE DEVICE AND TERMINAL

CROSS-REFERENCE TO RELATED APPLICATION

The present application claims a priority to Chinese Patent Application No. 201510461236.X filed on Jul. 30, 2015, the disclosure of which is incorporated in its entirety by reference herein.

TECHNICAL FIELD

The present disclosure relates to the field of power supplying technology for electronic devices, and in particular to a wearable device and a terminal.

BACKGROUND

With the development of terminal technology, a user may use a terminal in various aspects. However, there is no significant breakthrough in capacity of a battery of the terminal. In many cases, due to limited battery capacity and high power consumption, the user may be subjected to inconvenient charging of the terminal.

Especially, in some emergency circumstances, the user may charge the terminal only by means of a portable power source or a wireless charging station. Actually, battery capacity of the portable power source is usually not too high for good portability; and in case of wireless charging, power conversion efficiency is low and health of the user may be affected by generated high radiation.

In view of the above, a power supplying solution which overcomes the above-mentioned drawbacks is required.

SUMMARY

It is provided, in the present disclosure, a wearable device and a terminal capable of being charged with high efficiency anytime and anywhere.

It is provided a wearable device in the present disclosure, including: a wearable component and a power supply component fixed on the wearable component. The power supply component includes a first supporting surface, an energy conversion element and an energy storage element. The energy conversion element includes: a magnetic structure, an elastic structure and an induction coil; one end of the magnetic structure is connected to the first supporting surface through the elastic structure; and the magnetic structure moves with respect to the induction coil through the elastic structure when the wearable device is shaken, such that an electric current is generated in the induction coil. The energy storage element is adapted to store electric energy obtained by the energy conversion element.

Optionally, the elastic structure of the energy conversion element may include multiple micro springs; and the one end of the magnetic structure is connected to the first supporting surface through the multiple micro springs.

Optionally, the power supply component may further include a second supporting surface; and the energy conversion element may further include a limiting structure, which is positioned below another end of the magnetic structure and fixed on the second supporting surface, and is for limiting maximum displacement of the magnetic structure with respect to the induction coil.

Optionally, the limiting structure may include an airbag and an elastic cushion.

Optionally, the magnetic structure may be a pillar-shaped structure, a diameter of a middle section of the pillar-shaped structure is less than that of each of two end sections of the pillar-shaped structure, and the induction coil is wound around the middle section of the pillar-shaped structure.

Optionally, the energy storage element may include a rectifier transformer and an electric energy storage; and the electric energy storage is connected to the induction coil through the rectifier transformer and stores the electric energy obtained by the energy conversion element.

Optionally, there are multiple energy conversion elements, and the electric energy storage is connected to the induction coil of each of the multiple power conversion elements through the rectifier transformer.

Optionally, the electric energy storage is a capacitor whose electrodes are made of graphene.

Optionally, the power supply component may be fixed on the wearable component through a velcro tape, a snap fit or a slot lock.

It is further provided a terminal in the present disclosure, including: at least one power supply component. Each of the at least one power supply component includes a first supporting surface, an energy conversion element and an energy storage element. The energy conversion element includes: a magnetic structure, an elastic structure and an induction coil; one end of the magnetic structure is connected to the first supporting surface through the elastic structure; and the magnetic structure moves with respect to the induction coil through the elastic structure when the terminal is shaken, such that an electric current is generated in the induction coil. The energy storage element is adapted to store electric energy obtained by the energy conversion element.

Optionally, the elastic structure of the energy conversion element may include multiple micro springs; and the one end of the magnetic structure is connected to the first supporting surface through the multiple micro springs.

Optionally, the power supply component may further include a second supporting surface; and the energy conversion element may further include a limiting structure which is positioned below another end of the magnetic structure and fixed on the second supporting surface, and is for limiting maximum displacement of the magnetic structure with respect to the induction coil.

Optionally, the limiting structure may include an airbag and an elastic cushion.

Optionally, the magnetic structure may be a pillar-shaped structure, a diameter of a middle section of the pillar-shaped structure is less than that of each of two end sections of the pillar-shaped structure, and the induction coil is wound around the middle section of the pillar-shaped structure.

Optionally, the energy storage element may include a rectifier transformer and an electric energy storage; and the electric energy storage is connected to the induction coil through the rectifier transformer and stores the electric energy obtained by the energy conversion element.

Optionally, each of the at least one power supply component is provided with multiple power conversion elements; and the electric energy storage is connected to the induction coil of each of the multiple power conversion elements through the rectifier transformer.

In technical solutions of the present disclosure, since the wearable device and the terminal may easily get shaken when being carried, the kinetic energy generated through shake is converted into the electric energy and the electric energy is stored, thereby achieving charging anytime and anywhere. Compared with the related technologies where a portable power source or a wireless charging station is used to perform charging, the wearable device and the terminal in the present disclosure can generate electric energy by themselves; hence, such wearable device and terminal can be charged in various scenarios and has a very high use value.

DETAILED DESCRIPTION OF THE EMBODIMENTS

To further clarify technical solutions and advantages of the present disclosure, the present disclosure is described in detail hereinafter in conjunction with drawings and embodiments.

According to the embodiments of the present disclosure, it is provided a wearable device and a terminal, capable of being charged efficiently anytime and anywhere.

Figure 1:
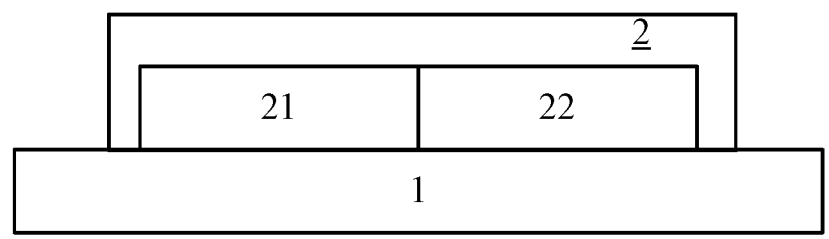
FIG. 1 is a schematic structural diagram of a wearable device provided in the present disclosure.

As shown in FIG. 1, a wearable device according to some embodiments of the present disclosure includes a wearable component 1 and a power supply component 2 fixed on the wearable component 1.

The power supply component 2 further includes a first supporting surface, an energy conversion element 21 for converting kinetic energy of the wearable device into electric energy, and an energy storage element 22 for storing the electric energy obtained by the energy conversion element 21.

Figure 2:
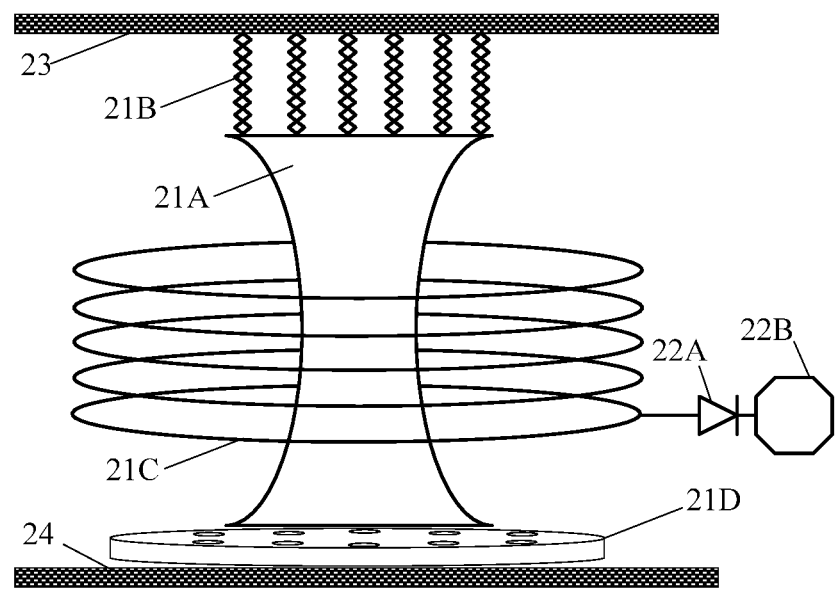
FIG. 2 is a schematic structural diagram of a power supply component provided in the present disclosure.

As shown in FIG. 2, the energy conversion element 21 includes a magnetic structure 21A, an elastic structure 21B and an induction coil 21C. One end of the magnetic structure 21A is connected to the first supporting surface 23 of the power supply component 2 through the elastic structure 21B. The first supporting surface 23 may be a surface of a main structure of the power supply component 2. In the embodiments, the magnetic structure 21A moves with respect to the induction coil 21C through the elastic structure 21B when the wearable device is shaken, such that an electric current is generated in the induction coil 21C.

In the embodiments, since the wearable device may easily get shaken when being carried, the kinetic energy generated through shake is converted into the electric energy and the electric energy is stored, thereby achieving charging anytime and anywhere. Compared with the related technologies where a portable power source or a wireless charging station is used to perform charging, the wearable device according to the embodiments of the present disclosure can generate electric energy by itself; hence, such wearable device can be charged in various scenarios and has a very high use value.

Optionally, in some embodiments of the present disclosure, as shown in FIG. 2, the magnetic structure 21A may be a pillar-shaped structure. A diameter of a middle section of the pillar-shaped structure is less than that of each of the two end sections of the pillar-shaped structure; thus, there is much room for winding the induction coil 21C and energy conversion efficiency is improved.

In a practical application, the elastic structure 21B of the energy conversion element 21 may include multiple micro springs, and one end of the magnetic structure 21A is connected to the first supporting surface 23 through the multiple micro springs.

Further, in order to avoid falling off or damage of the magnetic structure 21A due to severe shake of the wearable device, as shown in FIG. 2, the energy conversion element 21 may further include a limiting structure 21D, which is positioned below another end of the magnetic structure 21A and fixed on a second supporting surface 24 of the power supply component 2. The second supporting surface 24 may be a surface of the main structure of the power supply component 2. The limiting structure 21D is capable of limiting maximum displacement of the magnetic structure 21A. Practically, the limiting structure 21D may be an article for buffering the magnetic structure 21A, such as, an airbag, an elastic cushion or the like.

In the embodiments, as shown in FIG. 2, the energy storage element 22 includes a rectifier transformer 22A and an electric energy storage 22B.

The electric energy storage 22B is connected to the induction coil through the rectifier transformer 22A. An alternating current generated by the induction coil 21C is converted, by the rectifier transformer 22A, into a direct current whose voltage is in range of a rated voltage of the electric energy storage 22B, and the direct current is stored by the electric energy storage 22B.

Optionally, in some embodiments, the electric energy storage 22B may be a super capacitor whose electrodes are made of graphene. Charging efficiency and discharging efficiency of the super capacitor are much higher than those of a general electric energy storage.

Figure 3:
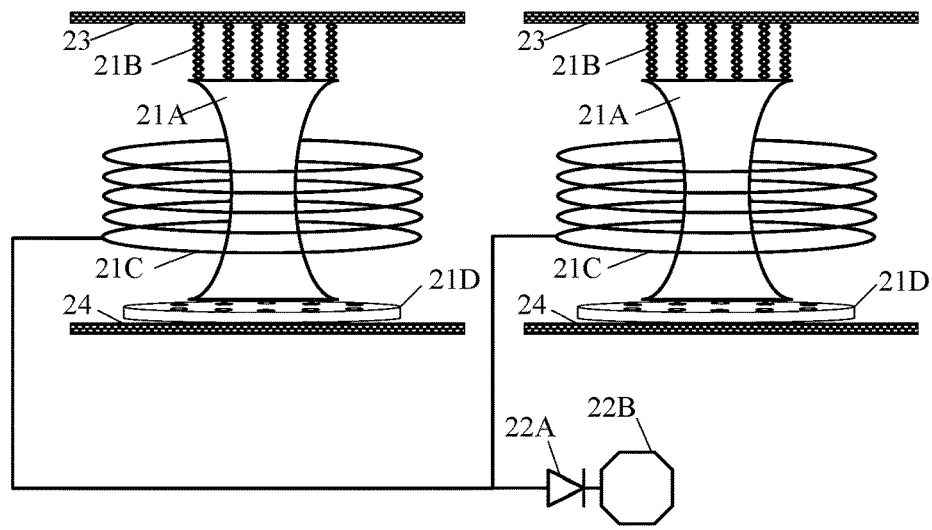
FIG. 3 is a schematic structural diagram of a power supply component including multiple power conversion elements provided in the present disclosure.

In a practical application, as shown in FIG. 3, in order to increase efficiency of the wearable device in generating a current, the power supply component 2 may include multiple energy conversion elements 21, and the electric energy storage 22B of the energy storage element 22 is connected to the induction coil 21C of each of the multiple energy conversion elements 21 through the rectifier transformer 22A.

A principle for generating electric energy of the power supply component of the present disclosure is explained above. In addition, electric energy may be generated in other manners for the skilled in the art. For example, a wearable device may utilize body temperature of a user to generate the electric energy, the power supply component may be provided with a closed loop circuit formed by connecting two sections of different metals, and a current may be generated through "Seebeck" effect in the case that temperatures of connecting points of the two sections of different metals are different. Actually, different charging manners may be combined for further improving charging efficiency.

Figure 5:
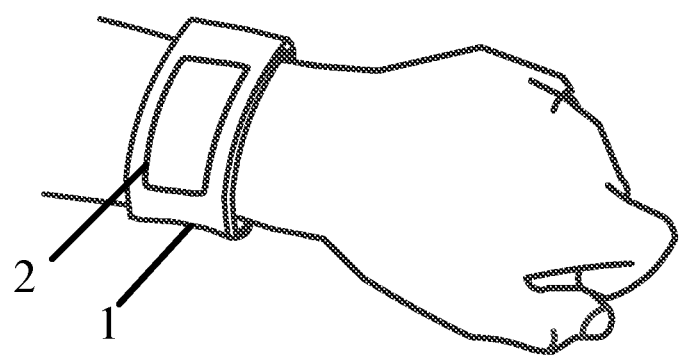
FIG. 5 is a schematic structural diagram of a wearable device provided in the present disclosure.

Practically, the power supply component may be fixed on the wearable component through a velcro tape, a snap fit, a slot lock or the like. In the case that the wearable component is designed as a ring structure, the wearable device may be worn as an accessory such as a bracelet (for example, as shown in FIG. 5, the wearable device is implemented as a bracelet, which includes the wearable component 1 and the power supply component 2) or a necklace by the user or may be bound to a vehicle such as a car or the like. Electric energy, which is obtained by converting the shake of a moving human body or a moving vehicle, can be stored. Moreover, the power supply component may be removed from the wearable component and used as a portable power source at any time.

Figure 4:
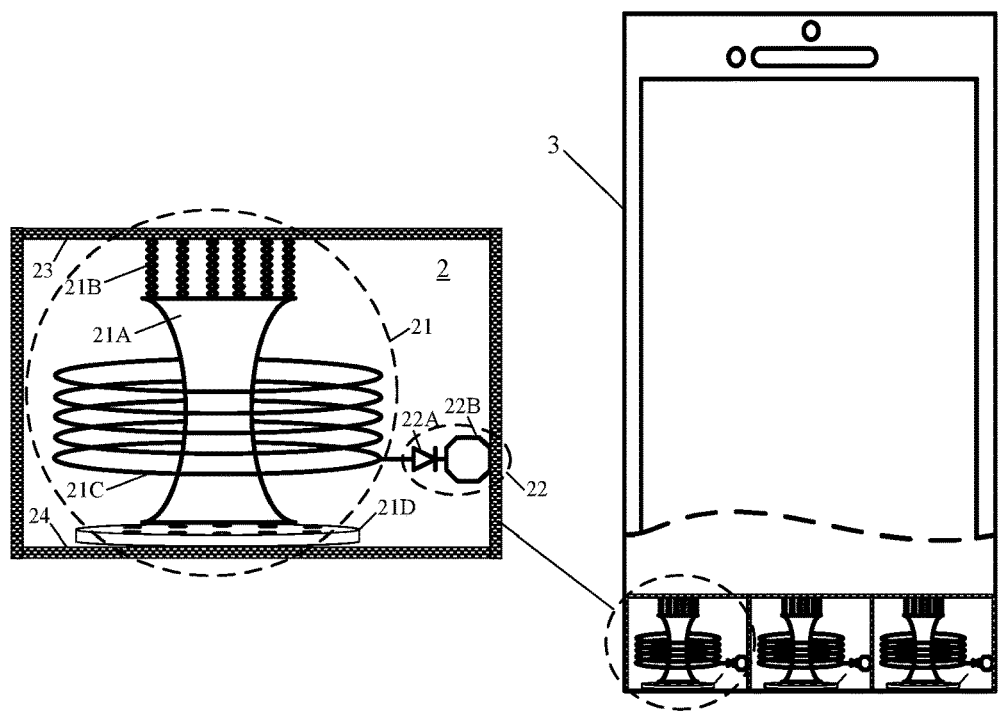
FIG. 4 is a schematic structural diagram of a terminal provided in the present disclosure.

Moreover, as shown in FIG. 4, it is further provided a terminal 3 according to some embodiments of the present disclosure. The terminal may be a smart phone, a tablet computer, an electronic reader, etc. The terminal 3 includes: at least one power supply component 2 including an energy conversion element 21 and an energy storage element 22. The energy conversion element 21 is adapted to convert kinetic energy of the terminal into electric energy, and the energy storage element 22 is adapted to store the electric energy obtained by the energy conversion element 21.

In the embodiments, since the terminal may easily get shaken when being carried, the kinetic energy generated through shake is converted into the electric energy and the electric energy is stored, thereby achieving charging anytime and anywhere. Compared with the related technologies where a portable power source or a wireless charging station is used to perform charging, the terminal according to the embodiments of the present disclosure can generate the electric energy by itself; hence, such terminal can be charged in various scenarios and has a very high use value.

In conjunction with FIG. 2, the power supply component 2 further includes a first supporting surface 23 and the energy conversion element 21 includes a magnetic structure 21A, an elastic structure 21B and an induction coil 21C; one end of the magnetic structure 21A is connected to the first supporting surface 23 through the elastic structure 21B, the magnetic structure 21A moves with respect to the induction coil 21C through the elastic structure 21B when the terminal 3 is shaken, such that an electric current is generated in the induction coil 21C. In a practical application, the elastic structure 21B may include multiple micro springs, and the one end of the magnetic structure 21A is connected to the first supporting surface 23 through the multiple micro springs.

Moreover, the power supply component 2 further includes a first supporting surface 24, and a limiting structure 21D is positioned below another end of the magnetic structure 21A and fixed on the second supporting surface 24. The limiting structure 21D is adapted to limit maximum displacement of the magnetic structure 21A with respect to the induction coil 21C, so as to avoid falling off or damage of the magnetic structure 21A due to severe shake of the terminal. Practically, the limiting structure 21D may be an article for buffering the magnetic structure 21A, such as, an airbag, an elastic cushion or the like.

Optionally, the magnetic structure 21A may be a pillar-shaped structure. A diameter of a middle section of the pillar-shaped structure is less than that of each of the two end sections of the pillar-shaped structure; thus, there is much room for winding the induction coil 21C and energy conversion efficiency is improved.

In the embodiments, as shown in FIG. 4, the energy storage element 22 includes a rectifier transformer 22A and an electric energy storage 22B.

The electric energy storage 22B is connected to the induction coil through the rectifier transformer 22A. An alternating current generated by the induction coil 21C is converted by the rectifier transformer 22A into a direct current and the direct current is stored in the electric energy storage 22B.

Optionally, in some embodiments, the electric energy storage 22B may be a super capacitor whose electrodes are made of graphene. Charging efficiency and discharging efficiency of the super capacitor are much higher than those of a general electric energy storage.

Moreover, in order to increase efficiency of the terminal 3 in generating a current, the power supply component 2 may include multiple energy conversion elements; and the electric energy storage 22B of the energy storage element 22 is connected to the induction coil 21C of each of the multiple energy conversion elements 21 through the rectifier transformer 22A.

The terminal of the present disclosure is described above. When being carried by the user, the terminal can convert the kinetic energy generated from shake into the electric energy, thereby achieving charging anytime and anywhere.

In a practical application, the energy storage element may be used in an emergency and may be provided to different terminal elements depending on of the amount of energy stored in the energy storage element, for example, may be used for providing emergency lighting, supplying power for a GPS module of a mobile phone or supplying power for a battery of the terminal.

In summary, with the wearable device and the terminal of the present disclosure, the kinetic energy can be converted into the electric energy for charging, and such charging manner is healthy and environmentally friendly, and is worth being popularized.

Those described above are preferred embodiments of the present disclosure. It should be noted that, for the skilled in the art, improvements and modifications may also be made without departing from the principle of the disclosure. Those improvements and modifications should also be included in the scope of protection of the present disclosure.

What is claimed is:

1. A wearable device, comprising:
a wearable component and a power supply component fixed on the wearable component;
wherein the power supply component comprises a first supporting surface, an energy conversion element and an energy storage element;
wherein the energy conversion element comprises: a magnetic structure, an elastic structure and an induction coil; one end of the magnetic structure is connected to the first supporting surface through the elastic structure; and the magnetic structure moves with respect to the induction coil through the elastic structure when the wearable device is shaken, such that an electric current is generated in the induction coil;
wherein the energy storage element is adapted to store electric energy obtained by the energy conversion element;
wherein the magnetic structure is a pillar-shaped structure, a diameter of a middle section of the pillar-shaped structure is less than a diameter of each of two end sections of the pillar-shaped structure, and the induction coil is wound around the middle section of the pillar-shaped structure;
wherein a cross section of the pillar-shaped structure comprises two edges each of which is a smooth curve, the cross section being parallel to a center axis of the pillar-shaped structure;
wherein the power supply component further comprises a second supporting surface; and the energy conversion element further comprises a limiting structure, and the limiting structure is positioned below another end of the magnetic structure and fixed on the second supporting surface, and is adapted to limit maximum displacement of the magnetic structure with respect to the induction coil; and wherein the limiting structure comprises an airbag or an elastic cushion.

2. The wearable device according to claim 1, wherein the elastic structure of the energy conversion element comprises a plurality of micro springs; and the one end of the magnetic structure is connected to the first supporting surface through the plurality of micro springs.

3. The wearable device according to claim 1, wherein the power supply component is fixed on the wearable component through a velcro tape, a snap fit or a slot lock.

4. The wearable device according to claim 1, wherein a diameter of the limiting structure is greater than the diameter of each of the two end sections of the pillar-shaped structure.

5. The wearable device according to claim 1, wherein
the energy storage element comprises a rectifier transformer and an electric energy storage; and
the electric energy storage is connected to the induction coil through the rectifier transformer to store the electric energy obtained by the energy conversion element.

6. The wearable device according to claim 5, wherein
there is a plurality of energy conversion elements, and the electric energy storage is connected to the induction coil of each of the plurality of energy conversion elements through the rectifier transformer.

7. The wearable device according to claim 5, wherein
the electric energy storage is a capacitor whose electrodes are made of graphene.

8. A terminal, comprising:
at least one power supply component;
wherein each of the at least one power supply component comprises a first supporting surface, an energy conversion element and an energy storage element;
wherein the energy conversion element comprises a magnetic structure, an elastic structure and an induction coil; one end of the magnetic structure is connected to the first supporting surface through the elastic structure; and the magnetic structure moves with respect to the induction coil through the elastic structure when the terminal is shaken, such that an electric current is generated in the induction coil;
wherein the energy storage element is adapted to store electric energy obtained by the energy conversion element;
wherein the magnetic structure is a pillar-shaped structure, a diameter of a middle section of the pillar-shaped structure is less than a diameter of each of two end sections of the pillar-shaped structure, and the induction coil is wound around the middle section of the pillar-shaped structure;
wherein a cross section of the pillar-shaped structure comprises two edges each of which is a smooth curve, the cross section being parallel to a center axis of the pillar-shaped structure;
the power supply component further comprises a second supporting surface; and the energy conversion element further comprises a limiting structure, and the limiting structure is positioned below another end of the magnetic structure and fixed on the second supporting surface and is adapted to limit maximum displacement of the magnetic structure with respect to the induction coil; and the limiting structure comprises an airbag or an elastic cushion.

9. The terminal according to claim 8, wherein
the elastic structure of the energy conversion element comprises a plurality of micro springs; and
the one end of the magnetic structure is connected to the first supporting surface through the plurality of micro springs.

10. The terminal according to claim 8, wherein a diameter of the limiting structure is greater than the diameter of each of the two end sections of the pillar-shaped structure.

11. The terminal according to claim 8, wherein
the energy storage element comprises a rectifier transformer and an electric energy storage; and
the electric energy storage is connected to the induction coil through the rectifier transformer to store the electric energy obtained by the energy conversion element.

12. The terminal according to claim 11, wherein
the each of the at least one power supply component comprises a plurality of energy conversion elements, and the electric energy storage is connected to the induction coil of each of the plurality of energy conversion elements through the rectifier transformer.

* * * * *